United States Patent [19]

Schmitter

[11] Patent Number: 4,960,808

[45] Date of Patent: Oct. 2, 1990

[54] STABILIZED ETHYLENE MONOXIDE-OLEFIN COPOLYMERS

[75] Inventor: André Schmitter, Hegenheim, France

[73] Assignee: Shell Oil Company, Houston, Tex.

[21] Appl. No.: 175,022

[22] Filed: Mar. 30, 1988

[30] Foreign Application Priority Data

Apr. 29, 1987 [GB] United Kingdom ............... 8710171

[51] Int. Cl.$^5$ ............ C08K 5/52; C08K 5/20; C08K 5/13
[52] U.S. Cl. ................ 524/151; 524/194; 524/222; 524/291
[58] Field of Search ............ 524/151, 194, 222, 291

[56] References Cited

U.S. PATENT DOCUMENTS

| | | | |
|---|---|---|---|
| 2,495,286 | 1/1950 | Brubaker | 260/63 |
| 3,660,438 | 5/1972 | Dexter | 524/194 |
| 3,677,965 | 7/1972 | Dexter et al. | 524/222 |
| 3,694,412 | 9/1972 | Nozaki | 260/63 |
| 3,929,727 | 12/1975 | Russell et al. | 260/48.95 F |
| 3,944,594 | 3/1976 | Kleiner et al. | 524/291 |
| 4,024,104 | 5/1977 | Russell et al. | 260/45.8 R |
| 4,290,941 | 9/1981 | Zinke et al. | 524/151 |

FOREIGN PATENT DOCUMENTS

| | | |
|---|---|---|
| 121965 | 8/1984 | European Pat. Off. |
| 181014 | 5/1986 | European Pat. Off. |
| 58-142924 | 8/1983 | Japan . |
| 1081304 | 3/1965 | United Kingdom . |

*Primary Examiner*—Veronica P. Hoke

[57] ABSTRACT

Linear alternating polymers of carbon monoxide and at least one ethylenically unsaturated hydrocarbon are stabilized against thermal degradation by the inclusion therein of certain phenolic compounds.

32 Claims, No Drawings

STABILIZED ETHYLENE MONOXIDE-OLEFIN COPOLYMERS

FIELD OF THE INVENTION

This invention relates to compositions comprising a linear alternating polymer of carbon monoxide and at least one ethylenically unsaturated hydrocarbon. More particularly, the invention relates to compositions of such polymers which are stabilized against thermal degradation by the inclusion therein of certain phenolic compounds as stabilizers.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical catalysts, e.g., peroxy compounds. U.K. No. 1,081,304 produces similar polymers of higher carbon monoxide content in the presence of alkylphosphine complexes of palladium as catalyst. Nozaki extended the process to produce linear alternating polymers through the use of arylphosphine complexes of palladium and certain inert solvents, e.g., U.S. Pat. No. 3,694,412.

More recently the class of linear alternating polymers of carbon monoxide and at least one ethylenically unsaturated hydrocarbon has become of greater interest in part because of the greater availability of the polymers. The more recent general process for the production of the polymers is illustrated by published European Patent Application Nos. 0,121,965 and 0,181,014. The process generally involves the use of a catalyst composition formed from a compound of a Group VIII metal selected from palladium, cobalt and nickel, the anion of a non-hydrohalogenic acid having a pKa below about 2 and a bidentate ligand of phosphorus, arsenic or antimony.

The resulting polymers are relatively high molecular weight materials having utility as premium thermoplastics in the production of shaped articles such as containers for food and drink and as parts and housings for the automotive industry. Although the polymers are relatively stable, the linear alternating polymers do undergo to some degree the degradation by exposure to elevated temperature characteristic of most if not all organic polymers. Russell et al, U.S. Pat. No. 3,929,729 and U.S. Pat. No. 4,024,104, teach the use of certain benzophenones and of certain benzotriazoles as thermal stabilizers for certain polymers of carbon monoxide and ethylene with the optional presence of third monomers.

Although the disclosure by Russell et al of such polymers is relatively broad, the polymers tested are rather limited and the disclosure does not appear to be directed toward linear alternating polymers. Not all of the thermal stabilizers which are usefully employed with other polymer substrates function efficiently with the linear alternating polymers of carbon monoxide and ethylenically unsaturated hydrocarbon(s). It would be of advantage to provide for efficient stabilization of such polymers against thermal degradation.

SUMMARY OF THE INVENTION

The invention relates to certain polymeric compositions stabilized against thermal degradation and to a process for the stabilization of the polymers. More particularly, the invention relates to compositions comprising a linear alternating polymer of carbon monoxide and at least one ethylenically unsaturated hydrocarbon, which compositions are stabilized against thermal degradation by the inclusion therein of certain organic phenolic compounds as stabilizers.

DESCRIPTION OF THE INVENTION

The polymers which are stabilized according to the invention are the linear alternating polymers of carbon monoxide and at least one ethylenically unsaturated hydrocarbon which are often referred to as polyketones or polyketone polymers. The ethylenically unsaturated hydrocarbons which are useful as precursors of the polyketone polymers have up to 20 carbon atoms inclusive, preferably up to 10 carbon atoms inclusive, and are aliphatic such as ethylene and other α-olefins including propylene, 1-butene, 1-octene and 1-dodecene, or are arylaliphatic containing an aryl substituent on an otherwise aliphatic molecule, particularly an aryl substituent on a carbon atom of the ethylenic unsaturation. Examples of the latter class of ethylenically unsaturated hydrocarbons are styrene, p-methylstyrene, p-ethylstyrene and m-isopropyl-styrene. Preferred polyketone polymers are copolymers of carbon monoxide and ethylene or terpolymers of carbon monoxide, ethylene and a second hydrocarbon of at least 3 carbon atoms, particularly an α-olefin such as propylene.

When the preferred terpolymers of carbon monoxide, ethylene and a second hydrocarbon are employed, there will be at least 2 units incorporating a moiety of ethylene for each unit incorporating a unit of the second hydrocarbon, preferably from about 10 units to about 100 units incorporating a moiety of ethylene per unit incorporating a moiety of the second hydrocarbon. The polymer chain of the preferred polymers is therefore represented by the formula

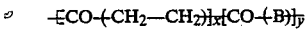

$$-\text{[CO--(CH}_2\text{--CH}_2\text{)]}_x\text{[CO--(B)]}_y-$$

where B is a moiety of the second hydrocarbon polymerized through the ethylenic unsaturation. The −(CO—CH$_2$—CH$_2$)−units and the —CO—(B)— units are formed randomly throughout the polymer chain and the ratio of y:x is no more than about 0.5. In the modification of the invention which employs copolymers of carbon monoxide and ethylene without the presence of a second hydrocarbon, the polymers are represented by the above formula wherein y=0. When y is other than 0, i.e., terpolymers are employed, ratios of y:x from about 0.01 to about 0.1 are preferred. The end groups or "caps" of the polymer chain will depend upon what materials are present during the production of the polymer and whether and how the polymer was purified. The precise nature of the end groups is of little significance so far as the overall properties of the polymers are concerned so that the polymers are fairly represented by the polymer chain as depicted above.

Of particular interest are the polymers of the above formula having a molecular weight of from about 1,000 to about 200,000, particularly those of molecular weight of from about 10,000 to about 50,000, containing substantially equimolar quantities of carbon monoxide and hydrocarbon. The physical properties of such polymers will depend in part on the molecular weight, whether the polymer is a copolymer or a terpolymer and the relative proportion of the second hydrocarbon present in the case of terpolymers. Typical melting points of such polymers are from about 175° C. to about 280° C., particularly from about 210° C. to about 270° C.

The polymers are produced by general methods illustrated by published European Patent Application Nos. 0,121,965 and 0,181,014. Although the scope of the polymerization process is extensive, a preferred catalyst composition for such polymerization is formed from palladium acetate, the anion of trifluoroacetic acid or p-toluenesulfonic acid and a bidentate ligand selected from 1,3-bis(diphenylphosphino)propane and 1,3-bis[-di(2-methoxyphenyl)phosphino]propane.

The polyketone polymers of the invention are stabilized against degradation caused by exposure to elevated temperature by the inclusion therein of a stabilizing quantity of an organic phenolic stabilizer selected from certain phenolic dicarboxylates, certain phenolic carboxamides and certain phenolic phosphites of defined structure. Although other materials are known to be useful as thermal stabilizers for various polymeric materials, the defined stabilizers appear to efficiently stabilize the particular class of polyketone polymers.

One class of phenolic stabilizers found to be useful as stabilizers for the polyketone polymers are phenolic dicarboxylates of the formula

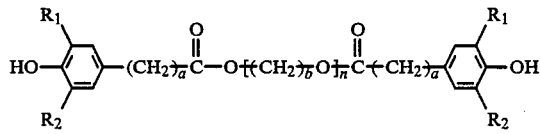

wherein a is an integer from 0 to 4 inclusive, b is an integer from 2 to 6 inclusive, n is an integer from 2 to 8 inclusive, $R_1$ independently is alkyl of from 1 to 6 carbon atoms inclusive and $R_2$ independently is $R_1$ or hydrogen. Preferred phenolic dicarboxylates of this formula are those wherein each of a and b is preferably 2, n is preferably 3, and $R_1$ and $R_2$ are each branched alkyl, i.e., alkyl branched at the carbon atom attached to the aromatic ring, preferably secondary alkyl and more preferably tertiary alkyl such as isopropyl, t-butyl and t-amyl. Illustrative of such a preferred phenolic dicarboxylate is the compound of the formula

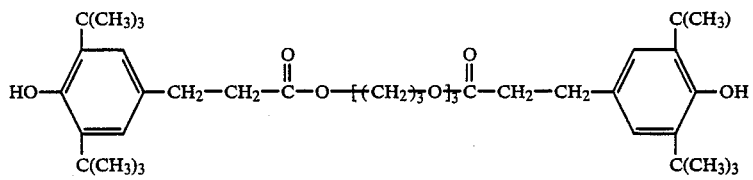

A second class of useful phenolic stabilizers are the phenolic dicarboxamides of the formula

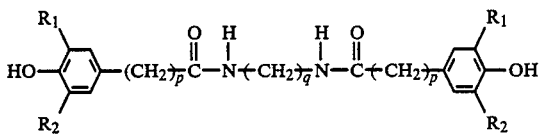

wherein p is an integer from 0 to 6 inclusive, q is an integer from 0 to 12 inclusive and $R_1$ and $R_2$ have the previously stated significance. Preferred phenolic dicarboxamides are those wherein p is 2, q is 0 or 6, and the preferred $R_1$ and $R_2$ groups are as defined above. Illustrative of such a dicarboxamide is the compound of the formula

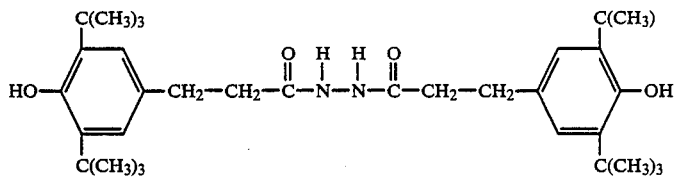

The phenolic phosphites which are useful stabilizers according to the invention are compounds of the formula

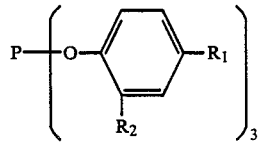

wherein $R_1$ and $R_2$ have the previously stated significance. Preferred $R_1$ and $R_2$ groups are as defined above and the compounds are illustrated by tris(2,4-di-tert-butylphenyl)phosphite.

The phenolic stabilizers as defined above are employed alone or as mixtures of more than one of the above stabilizers. In most cases, no particular advantage arises from use of a mixture but in a particular embodiment of the invention, a phenolic dicarboxamide of the above formula wherein q is an integer from 5 to 7 inclusive is advantageously employed as a mixture with a phenolic phosphite as defined above. When such a mixture is employed, the phenolic dicarboxamide and phenolic phosphite are employed in approximately equal proportions by weight, for example from about 0.8 part by weight to about 1.2 part by weight of the phenolic dicarboxamide for each part of the phenolic phosphite.

The stabilizer is employed in a quantity sufficient to effectively stabilize the polyketone polymer against thermal degradation. Such quantities are typically from about 0.03% to about 5% by weight of the stabilizer based on the total stabilized composition, preferably from about 0.1% to about 2% by weight of the stabilizer on the same basis.

The stabilizer is added to the polyketone polymer by conventional methods suitable for producing an intimate mixture of the polymer and the thermal stabilizer without unduly degrading the polymer or the stabilizer. Such methods include dry blending of the stabilizer and the polymer in a finely divided form followed by hot pressing, coextrusion of the polymer and stabilizer to thereby produce a stabilized composition as an extrudate, or by intimate mixing in a mixer or blender employing high shear. The stabilized compositions may also contain other additives such as colorants, plasticizers, fibers, reinforcements, dyes and carbon black which are added to the polymer together with or separately from the stabilizer.

The stabilized polyketone polymers are useful in the production of fibers, sheets, films, laminates, containers, wires and cables and shaped parts produced by conventional techniques such as melt-spinning, extrusion, injection molding, and thermoforming. The compositions are especially useful in applications where the finished product is likely to be subjected to elevated temperatures because of the enhanced thermal stability of the composition as compared to the polymer alone.

The invention is further illustrated by the following Illustrative Embodiment and Comparative Example:

Illustrative Embodiment

Test specimens were prepared from a linear alternating carbon monoxide/ethylene/propylene polymer having a melting point of 218° C. and an intrinsic viscosity, measured in m-cresol, of 1.6 dl/g. The specimens were 3 mm thick and 30 mm in length and were prepared by compression molding a mixture of the polymer and a candidate thermal stabilizer at 250° C. The test specimens were subjected to aerobic oven aging tests at three different temperatures. The specimens were bent to an angle of 180° by hand and the appearance of cracks was recorded as brittleness (failure). The time of heating in the oven until brittleness was determined.

The three candidate thermal stabilizers were the following:

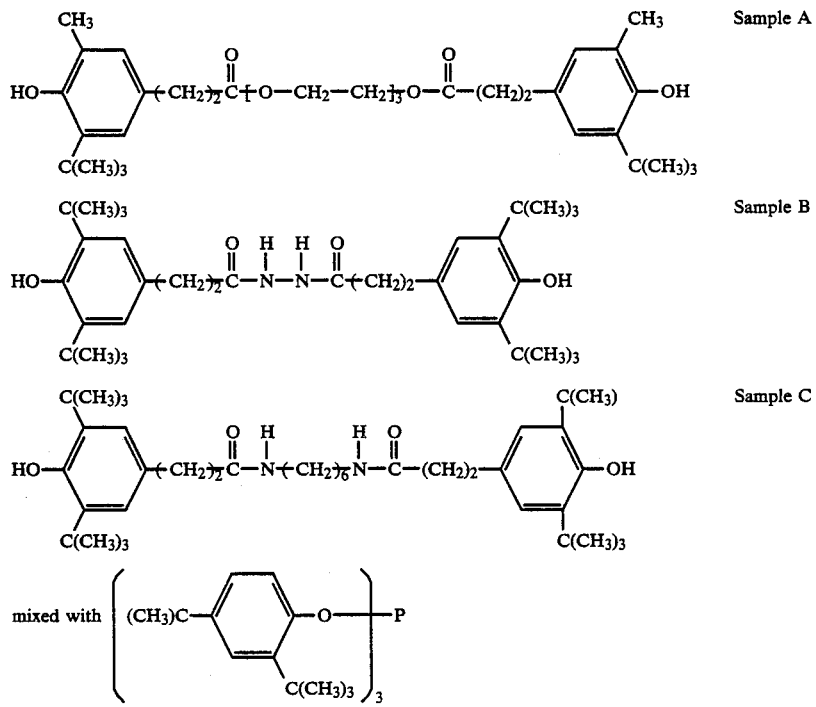

Samples A and B were employed in an amount of 0.5% by weight based on total composition and the components of Sample C were each present in an amount of 0.25% by weight on the same basis. The results of testing these samples are shown in the Table.

COMPARATIVE EXAMPLE

The procedures of the Illustrative Embodiment were employed to produce test specimens containing well-known thermal stabilizers of the following structures:

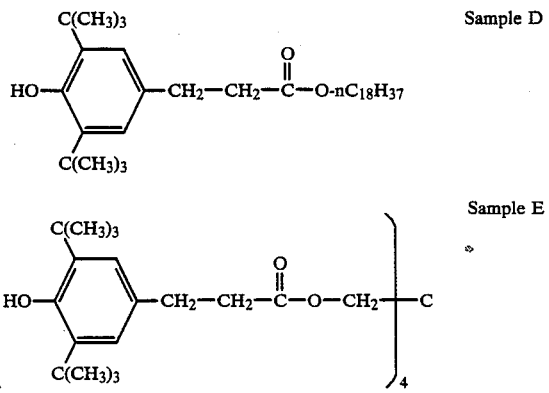

Samples D and E were employed in a quantity of 0.5% by weight based on total composition. Specimens containing Samples D and E were tested by the procedure of the Illustrative Embodiment. The results are shown in the Table.

TABLE

| Sample | Time to Failure (hrs) Heating at | | |
|---|---|---|---|
| | 135° C. | 115° C. | 105° C. |
| A | 65 | 240 | 390 |
| B | 70 | 260 | >500 |
| C | 170 | 170 | 390 |
| D | 17 | 90 | 210 |
| E | 12 | 70 | 240 |

What is claimed is:

1. A composition stabilized against thermal degradation comprising a linear alternating polymer of carbon monoxide and at least one ethylenically unsaturated hydrocarbon and intimately mixed therewith a stabilizing quantity of a phenolic stabilizer selected from
   (a) phenolic dicarboxylate of the formula

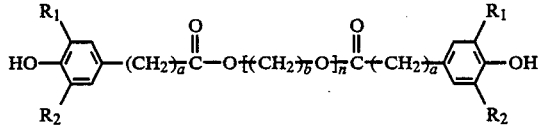

wherein a is an integer from 0 to 4 inclusive, b is an integer from 2 to 6 inclusive, n is an integer from 2 to 8 inclusive, $R_1$ independently is alkyl of from 1 to 6 carbon atoms inclusive and $R_2$ independently is $R_1$ or hydrogen,
   (b) phenolic dicarboxamide of the formula

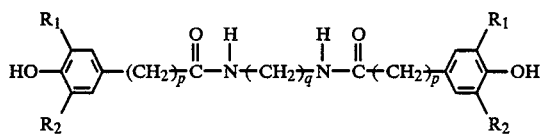

wherein p is an integer from 0 to 6 inclusive, q is an integer from 0 to 12 inclusive and $R_1$ and $R_2$ have the previously stated significance, and
   (c) phenolic phosphite of the formula

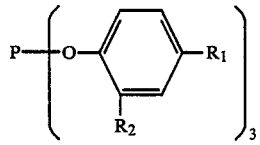

wherein $R_1$ and $R_2$ have the previously stated significance.

2. The composition of claim 1 wherein the polymer is represented by the formula

where B is a moiety of propylene polymerized through the ethylenic unsaturation and the ratio of y:x is no more than about 0.5.

3. The composition of claim 2 wherein y=0.

4. The composition of claim 2 wherein the ratio of y:x is from about 0.01 to about 0.1.

5. The composition of claim 4 wherein the phenolic stabilizer is said phenolic dicarboxylate.

6. The composition of claim 5 where, in said phenolic dicarboxylate, each of a and b is 2, n is 3 and each of $R_1$ and $R_2$ independently is branched alkyl.

7. The composition of claim 6 wherein $R_1$ and $R_2$ are each t-butyl.

8. The composition of claim 4 wherein the phenolic stabilizer is said phenolic dicarboxamide.

9. The composition of claim 8 where, in said phenolic dicarboxamide, p is 2, q is 0 or 6 and each of $R_1$ and $R_2$ independently is branched alkyl.

10. The composition of claim 9 wherein q is 0 and each of $R_1$ and $R_2$ is t-butyl.

11. The composition of claim 4 wherein the phenolic stabilizer is said phenolic phosphite.

12. The composition of claim 11 wherein each of $R_1$ and $R_2$ independently is branched alkyl.

13. The composition of claim 12 wherein each of $R_1$ and $R_2$ is t-butyl.

14. The composition of claim 4 wherein the stabilizer is a mixture of said phenolic dicarboxamide, wherein q is from 5 to 7 inclusive, and said phenolic phosphite.

15. The composition of claim 14 wherein the mixture is a mixture of approximately equal proportions by weight of said phenolic dicarboxamide wherein p is 2, q is 6 and each of $R_1$ and $R_2$ independently is branched alkyl and said phenolic phosphite wherein each of $R_1$ and $R_2$ independently is branched alkyl.

16. The composition of claim 15 wherein each of $R_1$ and $R_2$ is t-butyl.

17. A method of stabilizing a linear alternating polymer of carbon monoxide and at least one ethylenically unsaturated hydrocarbon against thermal degradation by incorporating therein a stabilizing quantity of a phenolic stabilizer selected from
   (a) phenolic dicarboxylate of the formula

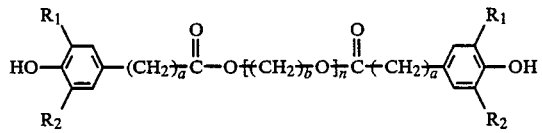

wherein a is an integer from 0 to 4 inclusive, b is an integer from 2 to 6 inclusive, n is an integer from 2 to 8 inclusive, $R_1$ independently is alkyl of from 1 to 6 carbon atoms inclusive and $R_2$ independently is $R_1$ or hydrogen,
   (b) phenolic dicarboxamide of the formula

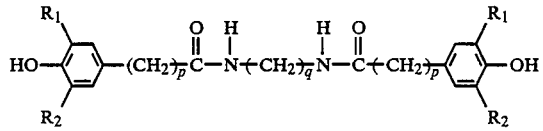

wherein p is an integer of 0 to 6 inclusive, q is an integer from 0 to 12 inclusive and $R_1$ and $R_2$ have the previously stated significance, and
   (c) phenolic phosphite of the formula

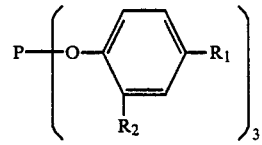

wherein $R_1$ and $R_2$ have the previously stated significance.

18. The method of claim 17 wherein the polymer is represented by the formula

where B is a moiety of propylene polymerized through the ethylenic unsaturation and the ratio of y:x is no more than about 0.5.

19. The method of claim 18 wherein y=0.

20. The method of claim 18 wherein the ratio of y:x is from about 0.01 to about 0.1.

21. The method of claim 20 wherein the stabilizer is said phenolic dicarboxylate.

22. The method of claim 21 where, in said phenolic dicarboxylate, each of a and b is 2, n is 3 and each of $R_1$ and $R_2$ independently is branched alkyl.

23. The method of claim 22 wherein each of $R_1$ and $R_2$ is t-butyl.

24. The method of claim 20 wherein the stabilizer is said phenolic dicarboxamide.

25. The method of claim 24 where, in said phenolic dicarboxamide, p is 2, q is 0 or 6 and each of $R_1$ and $R_2$ independently is branched alkyl.

26. The method of claim 25 wherein q is 0 and each of $R_1$ and $R_2$ is t-butyl.

27. The method of claim 20 wherein the phenolic stabilizer is said phenolic phosphite.

28. The method of claim 27 wherein each of $R_1$ and $R_2$ independently is branched alkyl.

29. The method of claim 28 wherein each of $R_1$ and $R_2$ is t-butyl.

30. The method of claim 20 wherein the stabilizer is a mixture of said phenolic dicarboxamide, wherein q is from 5 to 7 inclusive, and said phenolic phosphite.

31. The method of claim 30 wherein the mixture is a mixture of approximately equal proportions by weight of said phenolic dicarboxamide wherein p is 2, q is 6 and each of $R_1$ and $R_2$ independently is branched alkyl and said phenolic phosphite wherein each of $R_1$ and $R_2$ independently is branched alkyl.

32. The method of claim 31 wherein each of $R_1$ and $R_2$ is t-butyl.

* * * * *